(12) United States Patent
Guo et al.

(10) Patent No.: US 8,780,477 B1
(45) Date of Patent: Jul. 15, 2014

(54) DISK DRIVE ADJUSTING SERVO TIMING TO COMPENSATE FOR TRANSIENT WHEN CROSSING A SERVO ZONE BOUNDARY

(75) Inventors: Wei Guo, Fremont, CA (US); Michael Chang, San Jose, CA (US); Guoxiao Guo, Irvine, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 77 days.

(21) Appl. No.: 13/529,904

(22) Filed: Jun. 21, 2012

(51) Int. Cl.
*G11B 5/09* (2006.01)

(52) U.S. Cl.
USPC .................. 360/51; 360/53; 360/39; 360/55; 360/70; 360/75

(58) Field of Classification Search
None
See application file for complete search history.

(56) References Cited

U.S. PATENT DOCUMENTS

| | | | |
|---|---|---|---|
| 5,208,556 A | 5/1993 | Wilson | |
| 5,384,671 A | 1/1995 | Fisher | |
| 5,418,659 A | 5/1995 | Shergill | |
| 5,739,994 A | 4/1998 | Ottesen et al. | |
| 5,796,535 A | 8/1998 | Tuttle et al. | |
| 5,861,766 A | 1/1999 | Baumer et al. | |
| 5,956,196 A | 9/1999 | Hull et al. | |
| 6,028,727 A | 2/2000 | Vishakhadatta et al. | |
| 6,084,738 A | 7/2000 | Duffy | |
| 6,118,604 A | 9/2000 | Duffy | |
| 6,178,056 B1 | 1/2001 | Cloke et al. | |
| 6,262,857 B1 | 7/2001 | Hull et al. | |
| 6,388,829 B1 | 5/2002 | Nazarian | |
| 6,411,452 B1 | 6/2002 | Cloke | |
| 6,441,981 B1 | 8/2002 | Cloke et al. | |
| 6,519,104 B1 | 2/2003 | Cloke et al. | |
| 6,628,171 B1 | 9/2003 | Chou et al. | |
| 6,873,483 B2 | 3/2005 | Hetzler et al. | |
| 6,943,978 B1 | 9/2005 | Lee | |
| 6,992,856 B2 | 1/2006 | Ehrlich | |
| 7,006,316 B1 | 2/2006 | Sargenti, Jr. et al. | |
| 7,012,773 B2 | 3/2006 | Ashikaga et al. | |
| 7,035,026 B2 | 4/2006 | Codilian et al. | |
| 7,054,083 B2 | 5/2006 | Ehrlich | |
| 7,072,128 B2 | 7/2006 | Ehrlich | |
| 7,075,742 B2 | 7/2006 | Ehrlich | |
| 7,092,177 B2 | 8/2006 | Ehrlich | |
| 7,333,286 B2 | 2/2008 | Jung et al. | |
| 7,388,817 B2 | 6/2008 | Tsunoda | |
| 7,405,893 B2 | 7/2008 | Bi et al. | |
| 7,453,661 B1 | 11/2008 | Jang et al. | |
| 7,505,223 B1 | 3/2009 | McCornack | |
| 7,535,805 B2 * | 5/2009 | Hsin ..................... 369/44.28 |
| 7,715,138 B1 | 5/2010 | Kupferman | |
| 7,729,074 B2 | 6/2010 | Venkataramani et al. | |
| 7,813,065 B2 | 10/2010 | Annampedu et al. | |

(Continued)

*Primary Examiner* — Muhammad N Edun

(57) ABSTRACT

A disk drive is disclosed comprising a head actuated over a disk comprising a plurality of servo sectors defining a plurality of servo tracks, wherein the servo tracks form a plurality of servo zones, and a servo data rate of servo sectors in a first servo zone is different than a servo data rate of servo sectors in a second servo zone. A disk locked clock is synchronized to the data rate of the servo sectors in the first servo zone, wherein the disk locked clock for generating a timing window relative to the servo sectors. When the head crosses from the first servo zone to the second servo zone, at least one of the disk locked clock and the timing window is adjusted to compensate for a timing transient.

22 Claims, 10 Drawing Sheets

(56) References Cited

U.S. PATENT DOCUMENTS

| | | |
|---|---|---|
| 7,843,662 B1 | 11/2010 | Weerasooriya et al. |
| 7,929,238 B1 | 4/2011 | Vasquez |
| 8,022,774 B2 | 9/2011 | Ueno et al. |
| 8,031,429 B2 | 10/2011 | Gerasimov |
| 8,116,023 B1 | 2/2012 | Kupferman |
| 8,120,868 B2 | 2/2012 | Bi et al. |
| 8,213,106 B1 | 7/2012 | Guo et al. |
| 8,576,506 B1 | 11/2013 | Wang et al. |
| 2003/0086196 A1 | 5/2003 | Morris et al. |
| 2004/0160696 A1 | 8/2004 | Meyer |
| 2007/0047132 A1 | 3/2007 | Sado et al. |
| 2007/0064325 A1 | 3/2007 | Bi et al. |
| 2007/0081268 A1 | 4/2007 | Jung et al. |
| 2007/0211367 A1 | 9/2007 | Lau et al. |
| 2007/0211369 A1 | 9/2007 | Yang et al. |
| 2008/0002279 A1 | 1/2008 | Kouhara et al. |
| 2008/0239556 A1 | 10/2008 | Wiseman et al. |
| 2009/0086357 A1 | 4/2009 | Ehrlich |

\* cited by examiner

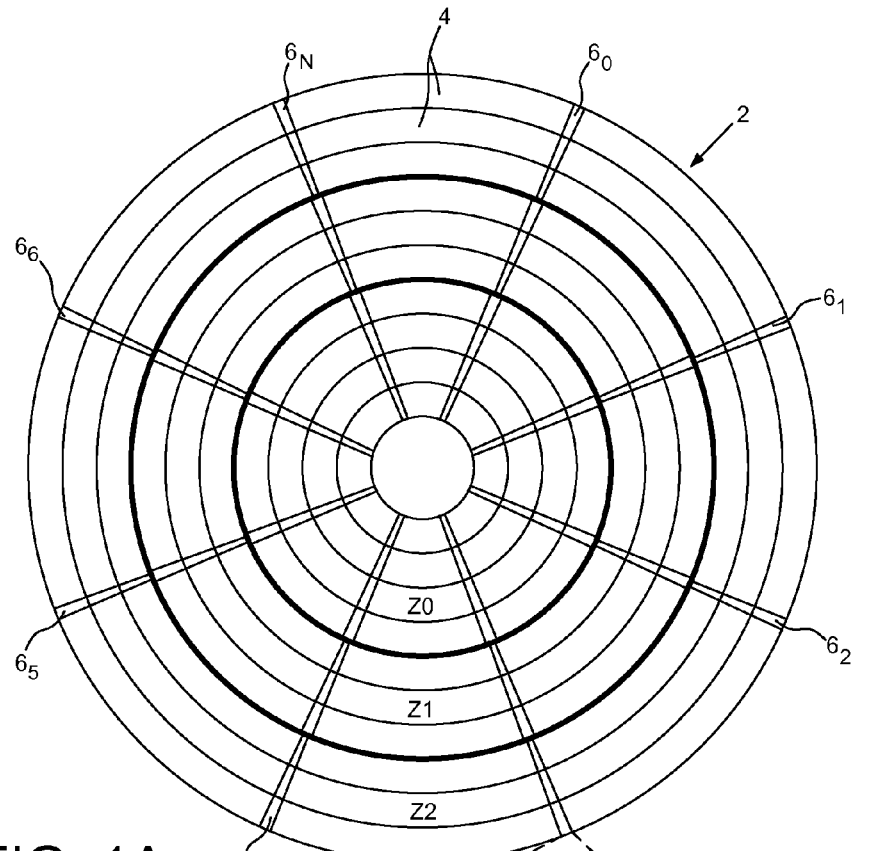
FIG. 1A
(Prior Art)
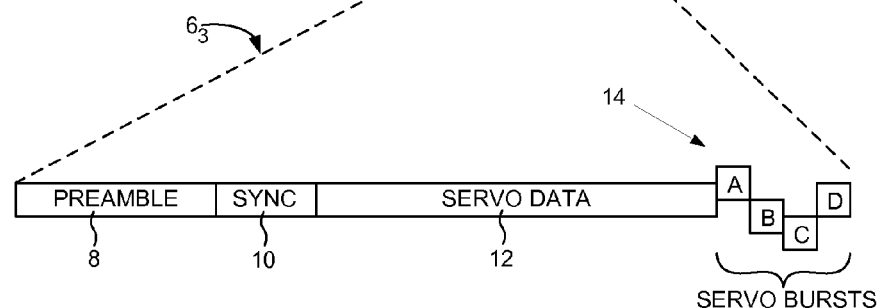
FIG. 1B
(Prior Art)

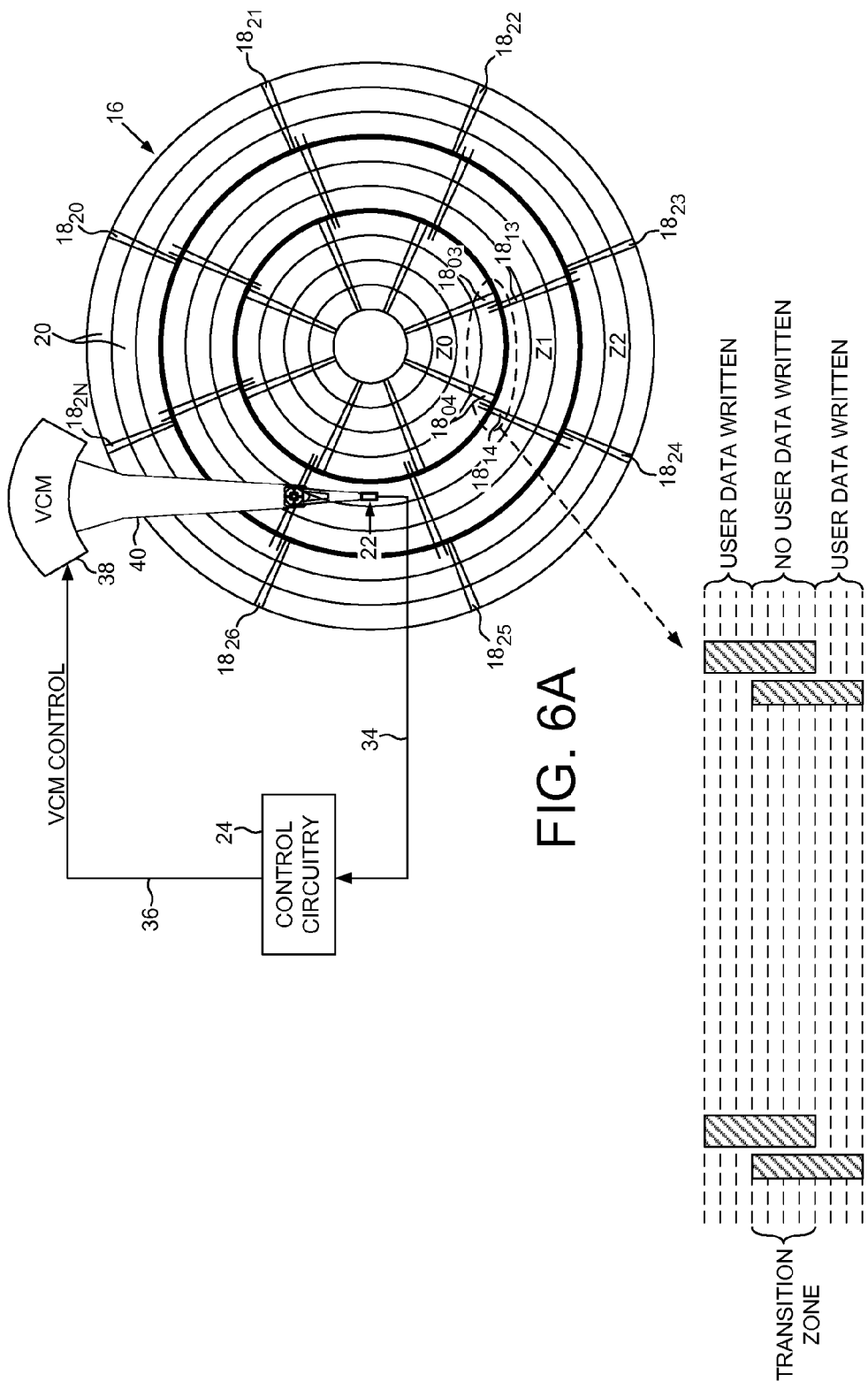

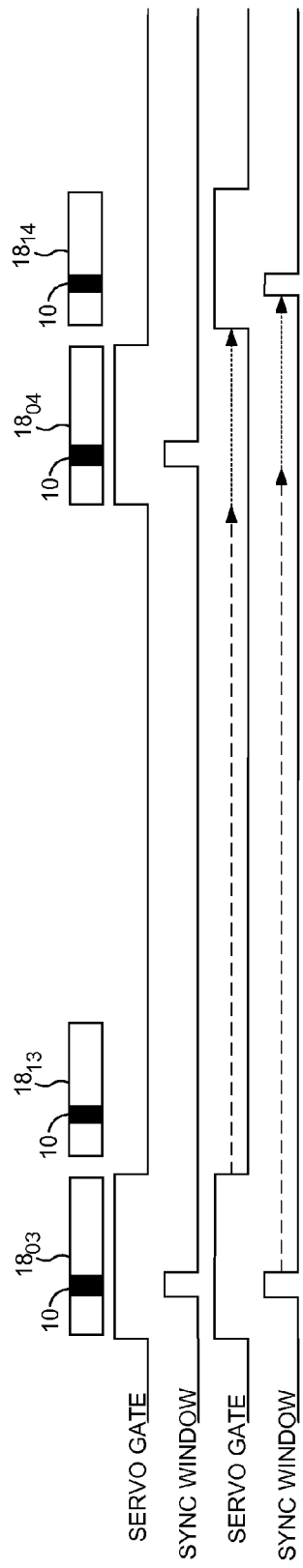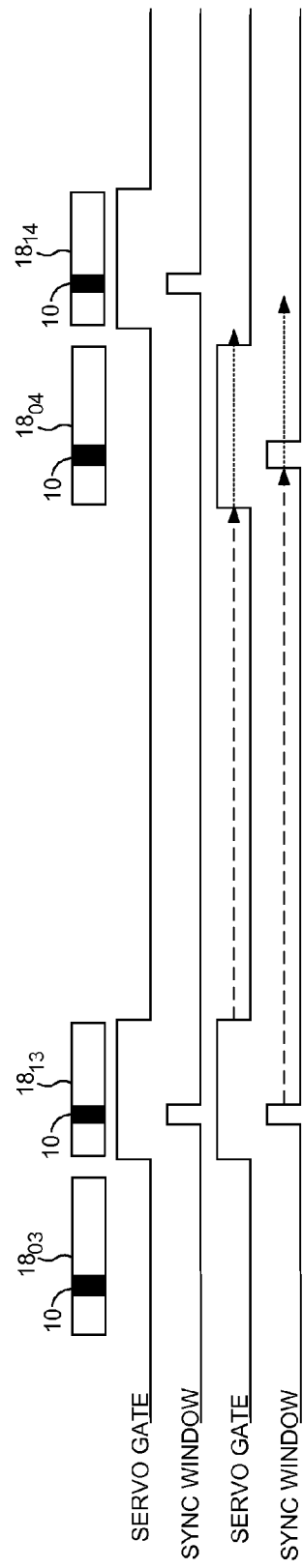

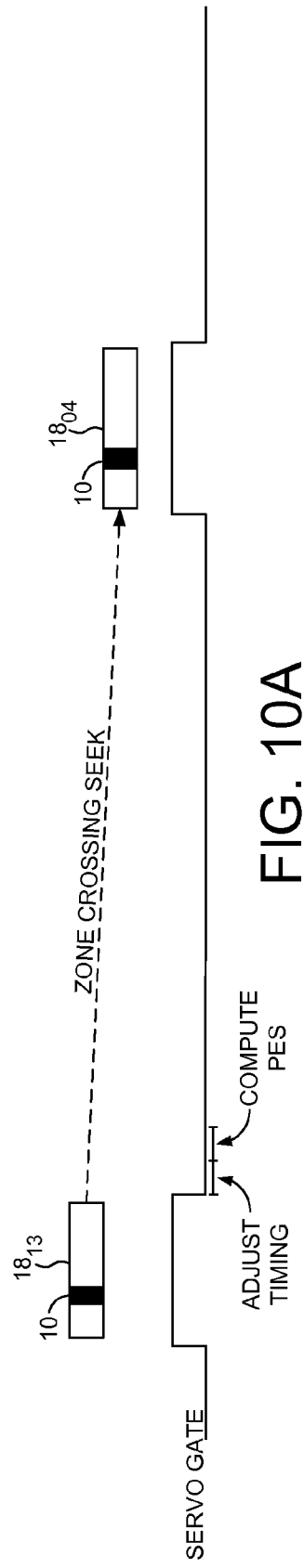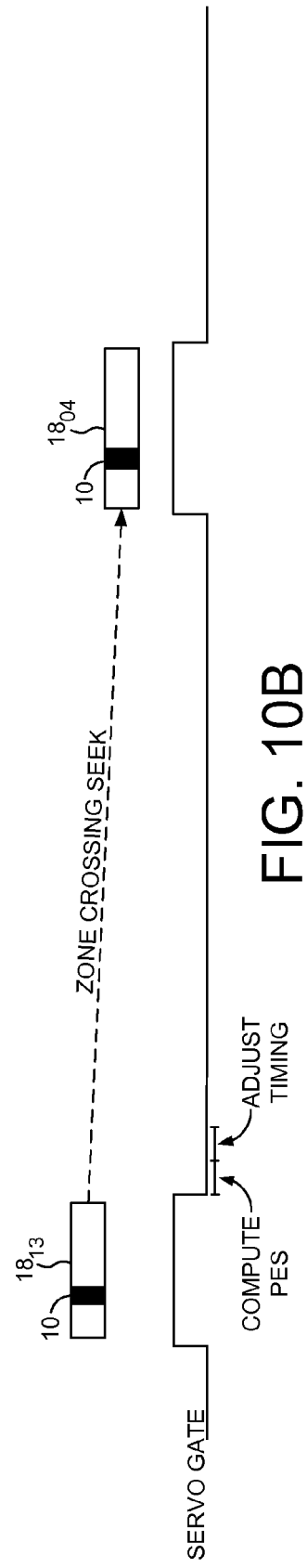

DISK DRIVE ADJUSTING SERVO TIMING TO COMPENSATE FOR TRANSIENT WHEN CROSSING A SERVO ZONE BOUNDARY

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

Because the disk is rotated at a constant angular velocity, the user data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the user data rate is constant across a zone, and increased from the inner diameter zones to the outer diameter zones. This is illustrated in FIG. 1A, which shows a prior art disk format 2 comprising a number of data tracks 4, wherein the data tracks are banded together in this example to form three physical zones from the inner diameter of the disk (Z0) to the outer diameter of the disk (Z2).

The prior art disk format of FIG. 1A also comprises a number of servo sectors $6_0$-$6_N$ recorded around the circumference of the disk 2 that define a plurality of servo tracks, wherein the data tracks 4 are defined relative to the servo tracks. Each servo sector $6_i$ may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

To facilitate demodulating the servo sectors $6_0$-$6_N$, a timing control loop generates a disk locked clock synchronized to the data rate of the servo sectors $6_0$-$6_N$. The disk locked clock generates suitable timing information, such as a servo gate that times the circumferential location of the servo sectors $6_0$-$6_N$, and a sync window that times the circumferential location of the sync marks 10 within the servo sectors $6_0$-$6_N$ as shown in FIG. 1B.

In the embodiment of FIG. 1A, the data rate of the servo sectors $6_0$-$6_N$ changes in each physical zone similar to the data sectors in order to improve format efficiency. However, a zoned servo sector format may be problematic when a seek operation crosses a servo zone boundary. For example, if the location of a servo zone boundary is estimated incorrectly (too early or too late), the disk drive can lose synchronization to the servo sectors due to incorrect adjustments to servo control parameters, such as an incorrect adjustment to the servo gate, or an incorrect adjustment to the sync window, or an incorrect adjustment to the timing control loop that synchronizes the disk locked clock to the data rate of the servo sectors.

BRIEF DESCRIPTION OF THE DRAWINGS

FIG. 1A shows a prior art disk format comprising a plurality of servo zones defined by servo sectors recorded at varying data rates.

FIG. 1B shows prior art servo timing signals, including a servo gate and a sync window.

FIG. 6A shows an embodiment of the present invention wherein the disk comprises overlapping, zoned servo sectors that facilitate transitioning between servo zones during a seek operation.

FIG. 6B shows an embodiment of the present invention wherein the overlapping, zoned servo sectors are interleaved over a transition zone.

FIGS. 7A and 7B illustrate how the servo gate and sync window are adjusted when transitioning between servo zones according to an embodiment of the present invention.

FIG. 10A illustrates an embodiment of the present invention wherein when the head crosses a servo zone boundary the timing adjustment is made prior to computing the position error signal (PES) for servoing the head.

FIG. 10B illustrates an embodiment of the present invention wherein when the head crosses a servo zone boundary the timing adjustment is made after computing the position error signal (PES) for servoing the head.

DETAILED DESCRIPTION

Figure 2A:
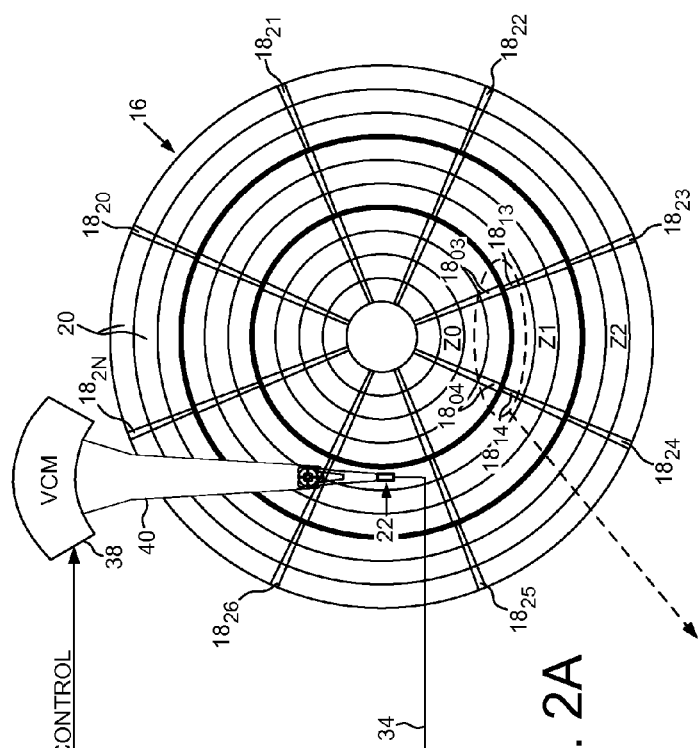
FIG. 2A shows a disk drive according to an embodiment of the present invention comprising a head actuated over a disk, the disk comprising zoned servo sectors.
Figure 2B:
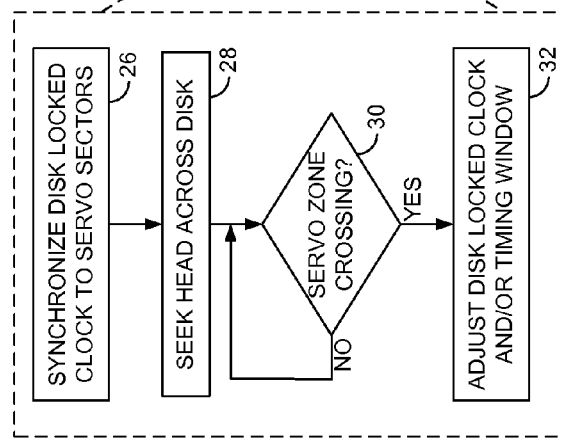
FIG. 2B is a flow diagram according to an embodiment of the present invention wherein when the head crosses a servo zone boundary, at least one of a disk locked clock and a timing window is adjusted to compensate for a timing transient.

FIG. 2A shows a disk drive according to an embodiment of the present invention comprising a disk 16 comprising a plurality of servo sectors $18_{i0}$-$18_{iN}$ (i represents a servo zone) defining a plurality of servo tracks 20, wherein the servo tracks form a plurality of servo zones (e.g., Z0-Z2), and a servo data rate of servo sectors in a first servo zone is different than a servo data rate of servo sectors in a second servo zone. The disk drive further comprises a head 22 actuated radially over the disk 16, and control circuitry 24 operable to execute the flow diagram of FIG. 2B. A disk locked clock is synchronized to the data rate of the servo sectors in the first servo zone (block 26), wherein the disk locked clock for generating a timing window relative to the servo sectors. A seek operation is executed to seek the head over the disk (block 28), and when the head crosses from the first servo zone to the second servo zone (block 30), at least one of the disk locked clock and the timing window is adjusted to compensate for a timing transient (block 32).

In the embodiment of FIG. 2A the control circuitry 24 processes a read signal 34 emanating from the head 22 to demodulate the servo sectors $18_{i0}$-$18_{iN}$ and generate a position error signal (PES) representing an error between the actual position of the head and a target position relative to a target track. The control circuitry 24 filters the PES using suitable compensation filters to generate a control signal 36 applied to a voice coil motor (VCM) 38 which rotates an actuator arm 40 about a pivot, thereby actuating the head 22 radially over the disk 16 in a direction that reduces the PES. The servo sectors $18_{i0}$-$18_{iN}$ may comprise any suitable position information, such as a track and wedge address for coarse positioning and servo bursts for fine positioning as described above with reference to FIG. 1A. The servo bursts may comprise any suitable pattern, such as an amplitude based servo pattern as shown in FIG. 1A, or a suitable phase based servo pattern.

Figure 2C:
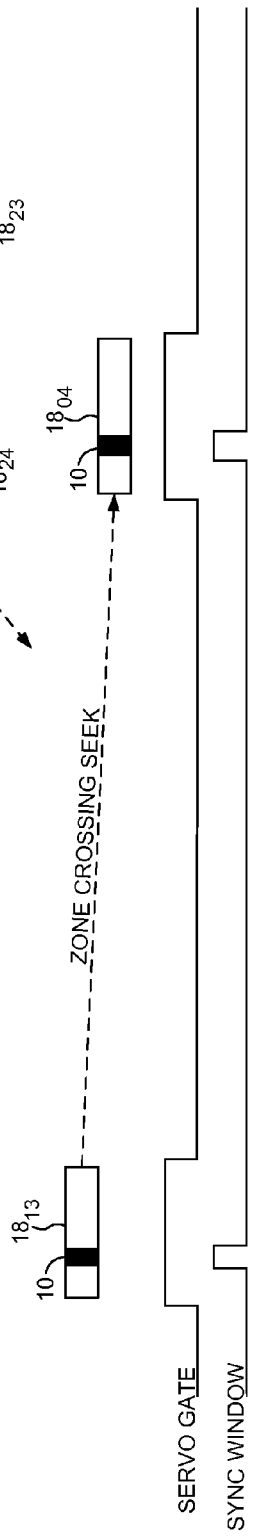
FIG. 2C shows an embodiment of the present invention wherein a servo gate and a sync window are adjusted when the head crosses a servo zone boundary.

Varying the servo data rate across the servo zones (by increasing the servo data rate toward the outer diameter servo zones) increases the capacity of the disk 16 by reducing the area consumed by the servo sectors. To facilitate a servo zone crossing during a seek operation, at least one of the disk locked clock and the timing window is adjusted to compensate for a timing transient. FIG. 2C shows an embodiment wherein the timing window comprises a servo gate that times a circumferential location of the servo sectors $18_{i0}$-$18_{iN}$, and a sync window that times a circumferential location of a sync mark 10 within the servo sectors $18_{i0}$-$18_{i1}$N.

Figure 3:
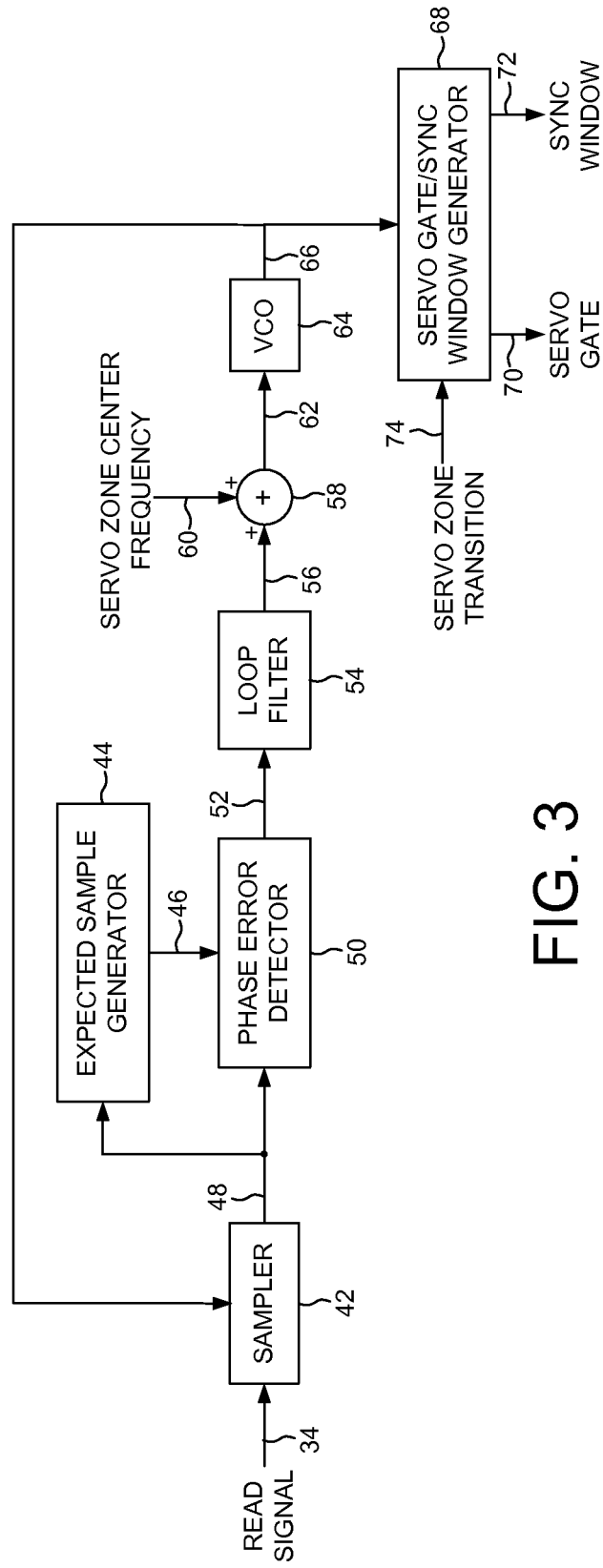
FIG. 3 shows a timing control loop for generating the servo gate and sync window according to an embodiment of the present invention.

Any suitable timing control loop may be employed in the embodiments of the present invention for generating the disk locked clock and the timing windows. FIG. 3 shows an example timing control loop comprising a phase locked loop (PLL) for synchronizing a sampling device 42 to the data rate of the read signal 34. An expected sample generator 44 generates expected samples 46 corresponding to a target response (e.g., a suitable partial response) relative to the read signal samples 48. A phase error detector 50 generates a phase error 52 in response to the expected samples 46 and the read signal samples 48. The phase error 52 is filtered with a suitable compensation filter 54 to generate a control signal 56. The control signal 56 is added 58 to a center frequency 60 to generate a frequency control signal 62 for a voltage controlled oscillator (VCO) 64. The output of the VCO 64 is a disk locked clock 66 that adjusts the frequency of the sampling device 42 until the read signal 34 is sampled synchronously. The disk locked clock 66 is also used to clock a signal generator 68 that generates the servo gate 70 and sync window 72. In another embodiment, the timing control loop may comprise a fixed rate sampling clock with an interpolator for generating the synchronous sample values and for timing the servo gate and sync window. When the head 22 crosses a servo zone boundary during a seek operation, a control signal 74 configures the signal generator 68 in order to adjust the servo gate 70 and/or the sync window 72.

Figure 4:
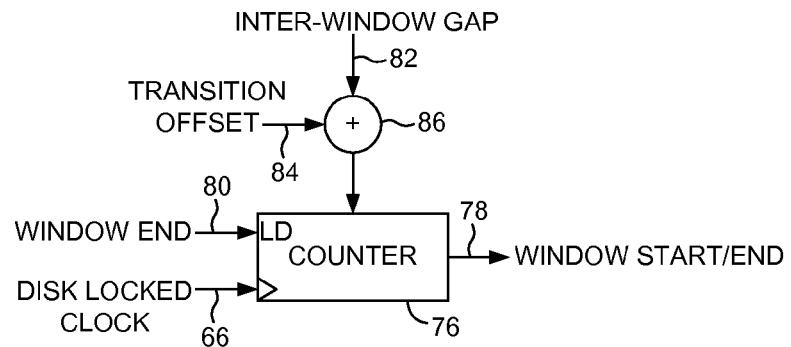
FIG. 4 shows an embodiment of the present invention wherein a counter that generates the timing window is adjusted by an offset to compensate for the timing transient when the head crosses a servo zone boundary.

FIG. 4 shows an embodiment of the present invention wherein the timing window (e.g., servo gate 70 and or sync window 72) are generated by clocking a counter 76 with the disk locked clock 66. When the counter 76 reaches a first target count, a signal 78 is toggled to indicate the start of the timing window. When the counter 76 reaches a second target count, the signal 78 is toggled to indicate the end of the window and the counter 76 is reloaded by signal 80 with an inter-window gap 82 in order to start the timing interval to the start of the next window. When the head 22 crosses a servo zone boundary during a seek operation, a transition offset 84 is added 86 to the inter-window gap 82 in order to compensate for the timing transient. In one embodiment, the timing transient is due to changing the center frequency 60 of the VCO 64 of the timing control loop shown in FIG. 3 which changes the frequency of the disk locked clock 66 that clocks the counter 76. The resulting timing transient may cause a positive or negative offset in the timing window, and therefore the transition offset 84 added to the inter-window gap 82 may be negative or positive, respectively. As described in greater detail below, the transition offset 84 may be calibrated by adjusting the transition offset 84 over multiple seek operations until a metric is optimized.

Figure 5A:
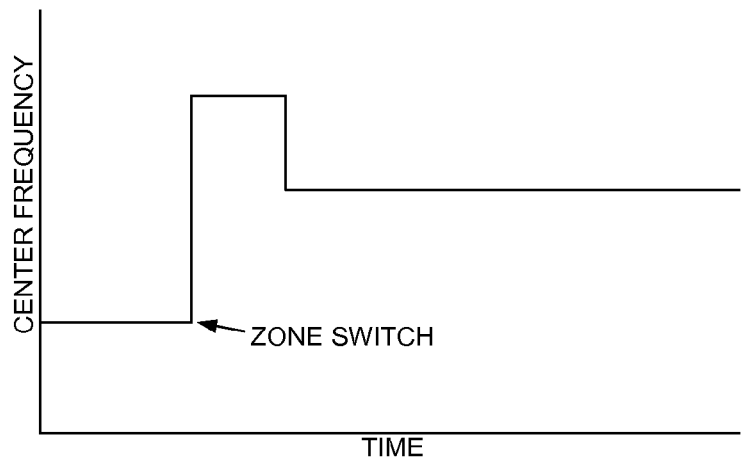
FIGS. 5A and 5B show an embodiment of the present invention wherein a center frequency of a phase locked loop (PLL) for generating a disk locked clock is adjusted to compensate for the timing transient when the head crosses a servo zone boundary.
Figure 5B:
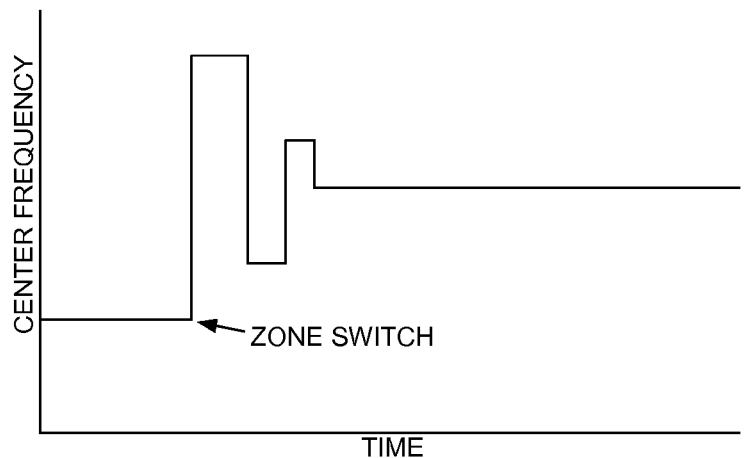

FIG. 5A shows an alternative embodiment for compensating for the timing transient when the head 22 crosses a servo zone boundary by generating a transient in the center frequency 60 of the VCO 64 that generates the disk locked clock 66. In the example of FIG. 5A, the center frequency is being adjusted from reading a lower data rate servo zone to a higher data rate servo zone. In this embodiment, there is a delay in the center frequency 60 reaching the target value, and a corresponding delay in the frequency of the disk locked clock 66. To compensate for the delay, an overshoot is added to the center frequency 60 for a predetermined interval before being reduced to the target value as shown in FIG. 5A. The overshoot is selected so that on average the number of clock cycles of the disk locked clock 66 over the inter-window gap is the same as the number of clock cycles when the disk locked clock 66 reaches steady state. The center frequency 60 may be adjusted by any suitable transient, wherein in an embodiment shown in FIG. 5B the transient may comprise an oscillation with a calibrated magnitude and frequency that may improve the timing compensation during a servo zone crossing.

FIG. 6A illustrates an embodiment of the present invention wherein the servo sectors $18_{i0}$-$18_{iN}$ are recorded so they overlap by a controlled amount at the servo zone boundaries as illustrated in FIG. 6B. In one embodiment, the overlapping servo sectors $18_{i0}$-$18_{iN}$ are interleaved within the transition zone such that the servo sectors of each servo zone pass under the head 22 in an alternating sequence. This is accomplished by recording the servo sectors $18_{i0}$-$18_{iN}$ with a circumferential offset between servo zones as illustrated in FIG. 6B. While the head 22 is within the transition zone during a seek operation, at least one of the disk locked clock and the timing window is adjusted in order to transition between the servo zones.

In one embodiment, user data is written in the data tracks outside the transition zones, whereas user data is not written in the data tracks within the transition zone. In this manner, the format complexity of accounting for twice the number of servo sectors within the transition zone is avoided. In one embodiment, the head 22 comprises a read element and a write element separated by a radial offset, and the transition zone shown in FIG. 6B is at least as wide as the radial offset between the read element and write element. This embodiment may help ensure both the read element and the write element are within the same servo zone when performing an access operation (write or read) of a data track.

In one embodiment, the data tracks are also banded together to define data zones, wherein the user data rate is increased toward the outer diameter zones in order to improve the format efficiency. The number of data zones may equal the number of servo zones, or the number of data zones may be less than or greater than the number of servo zones. The boundaries of the data zones may align with the boundary of a servo zone, or the data zone boundaries may be located at radial locations different from the boundaries of the servo zones.

FIG. 7A illustrates an embodiment of the present invention wherein the servo gate and the sync window are adjusted when transitioning between servo zones. In the example of FIG. 7A, the head 22 is seeking from servo zone Z0 to servo zone Z1 in FIG. 6A. When reading the servo sectors in servo zone Z0, the servo gate and sync window are opened relative to servo sectors $18_{03}$ and $18_{04}$. When a servo zone transition is executed, the servo gate and sync window are adjusted (increased) so as to time the circumferential location of the servo sector $18_{14}$ in servo zone Z1. A positive transition offset 84 may be added to the inter-window gap 82 as described above with reference to FIG. 4 to compensate for the timing transient due to the servo zone crossing. Alternatively in the example shown in FIG. 7A, the center frequency 60 of the VCO 64 that generates the disk locked clock 66 may be adjusted using a suitable transient when increasing the frequency toward the servo data rate of servo zone Z1 as described above with reference to FIGS. 5A and 5B. FIG. 7B illustrates an example where the head 22 is seeking from servo zone Z1 to servo zone Z0 in FIG. 6A. In this example, a negative transition offset 84 may be added to the inter-window gap 82 as described above with reference to FIG. 4, and/or the center frequency 60 of the VCO 64 that generates the disk locked clock 66 may be adjusted using a suitable transient when decreasing the frequency toward the servo data rate of servo zone Z0.

Figure 8A:
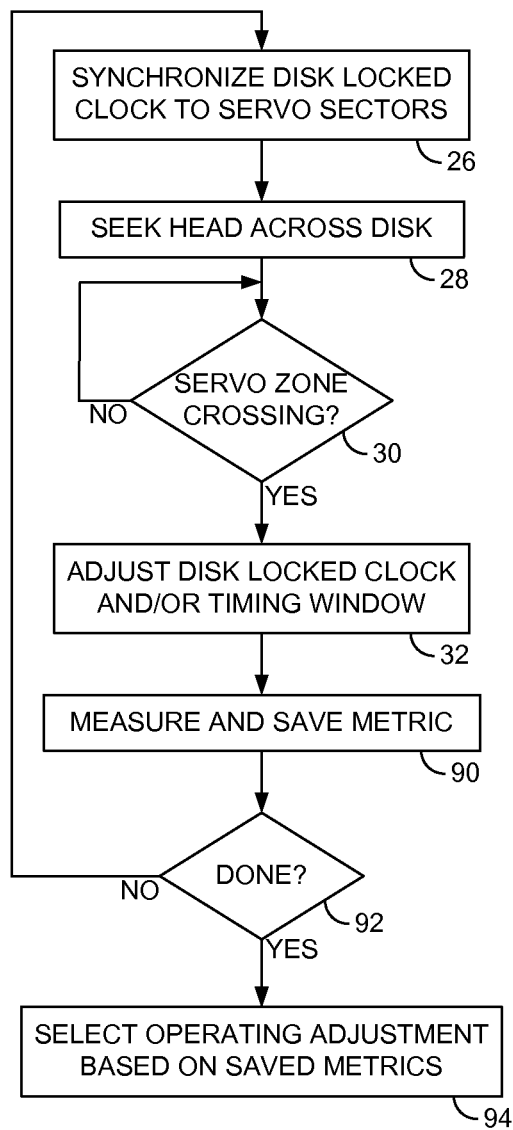
FIG. 8A is a flow diagram according to an embodiment of the present invention for calibrating the adjustment to the disk locked clock and/or timing window by measuring a metric over multiple seek operations.

FIG. 8A is a flow diagram according to an embodiment of the present invention for calibrating the adjustments to the disk locked clock and/or the timing window. After seeking the head across the disk (block 28) and across a servo zone boundary (block 30), at least one of the disk locked clock and the timing window is adjusted (block 32). A metric is measured and saved representing an efficacy of the adjustment (block 90). For example, the metric of the efficacy may be whether the sync mark in the following servo sector of the next servo zone is accurately detected. Other metrics of the efficacy may include an accumulated timing recovery error, an accumulated gain control error, or an accumulated sample error when acquiring the preamble of the following servo sector in the next servo zone. The flow diagram is repeated (block 92) starting from block 26 using different adjustments to the disk locked clock and/or timing window with a corresponding metric measured and saved. The adjustment that generates the optimal metric is then selected as the operating adjustment used during normal operation of the disk drive (block 94).

Figure 8B:
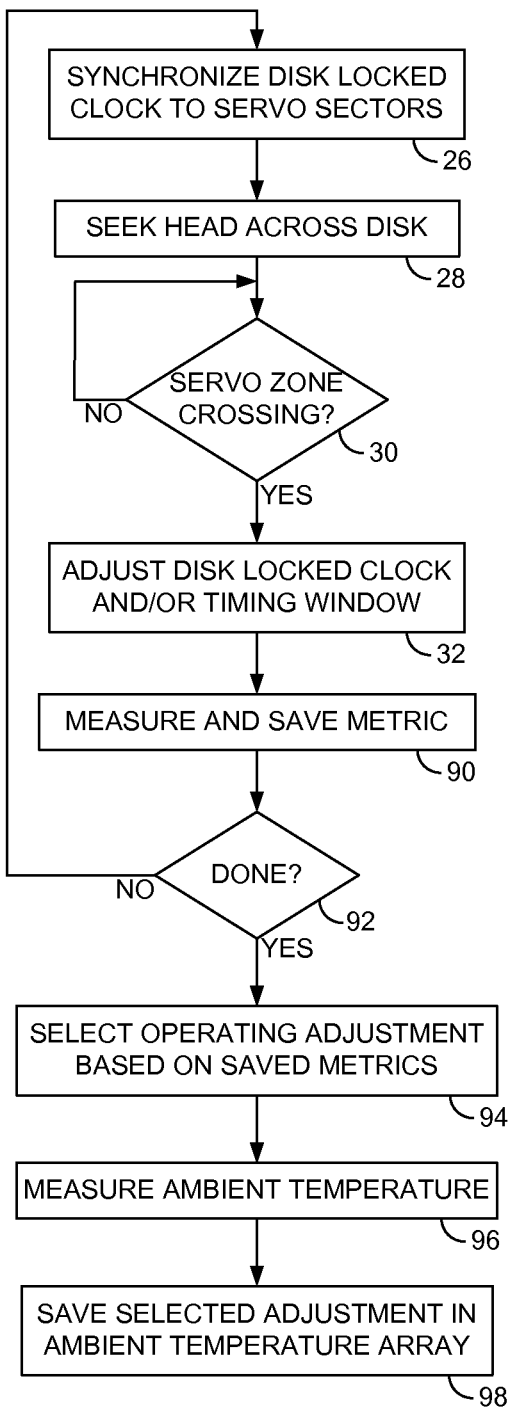
FIG. 8B is a flow diagram according to an embodiment of the present invention wherein the adjustment to the disk locked clock and/or timing window is calibrated over a range of ambient temperatures.

FIG. 8B is a flow diagram according to an embodiment of the present invention which expands on the flow diagram of FIG. 8A, wherein when the operating adjustment is selected corresponding to the optimal metric (block 94), the ambient temperature is also measured (block 96). The selected operating adjustment is then saved in an array indexed by the ambient temperature. During normal operation when the head 22 crosses a servo zone during normal operation (block 30) as shown in the flow diagram of FIG. 9, the ambient temperature is measured (block 100) and used to lookup of the corresponding timing adjustment from the array (block 102). This embodiment may help compensate for the effect ambient temperature may have on the operating characteristics of the timing recovery loop (e.g., on the VCO 64 that generates the disk locked clock 66).

Figure 9:
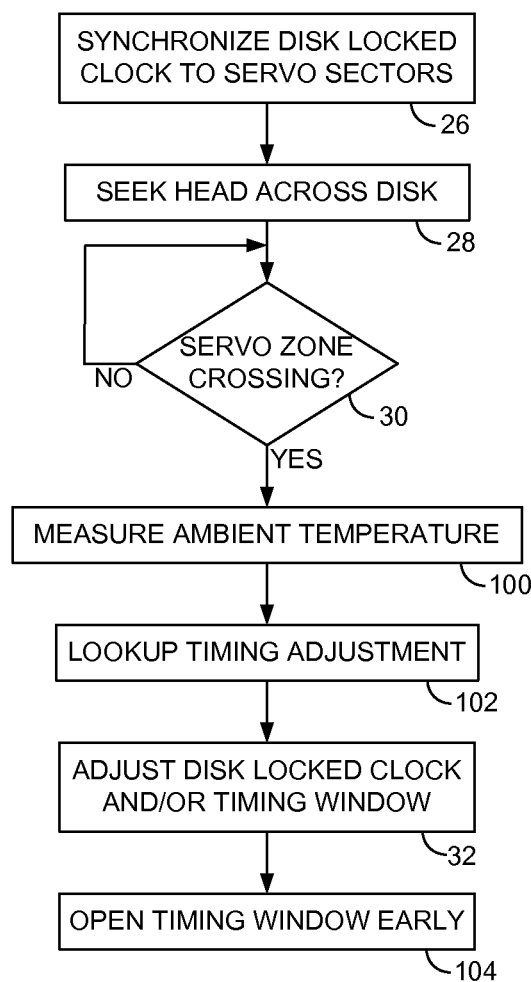
FIG. 9 is a flow diagram according to an embodiment of the present invention wherein the ambient temperature is measured during a normal seek operation and used to adjust the disk locked clock and/or the timing window when the head crosses a servo zone boundary.

The flow diagram of FIG. 9 also illustrates an embodiment wherein after making the timing adjustment during a servo zone crossing (block 32), the timing window (e.g., servo gate or sync window) may be opened early as the head approaches the following servo sector in the next servo zone (block 104). This embodiment may help compensate for the inaccuracy of the timing adjustment during a servo zone crossing by increasing the tolerance of the timing window(s).

The timing adjustment may be made at any suitable time during a servo zone crossing after reading the last servo sector of the current servo zone and prior to the head reaching the following servo sector in the next servo zone. FIG. 10A shows an embodiment of the present invention wherein the timing adjustment is made at the end of the servo gate window and prior to computing the PES for the last servo sector $18_{13}$ in the current servo zone. In an alternative embodiment shown in FIG. 10B, the timing adjustment is made after computing the PES for the last servo sector $18_{13}$ in the current servo zone. The latter embodiment reduces the transport delay of the servo control system by computing the PES first, and then making the timing adjustment. The latency associated with computing the PES in FIG. 10B is taken into account when calibrating the timing adjustment to the disk locked clock and/or the timing window. In one embodiment, the delay in making the timing adjustment is measured relative to the disk locked clock, and the delay (in clock cycles) is selected to be at least as long as the latency required to compute the PES in FIG. 10B.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
  a disk comprising a plurality of servo sectors defining a plurality of servo tracks, wherein:

the servo tracks form a plurality of servo zones;
a servo data rate of servo sectors in a first servo zone is different than a servo data rate of servo sectors in a second servo zone;
a head actuated radially over the disk; and
control circuitry operable to:
synchronize a disk locked clock to the data rate of the servo sectors in the first servo zone, wherein the disk locked clock for generating a timing window relative to the servo sectors; and
when the head crosses from the first servo zone to the second servo zone, adjust at least one of the disk locked clock and the timing window to compensate for a timing transient.

2. The disk drive as recited in claim 1, wherein the timing window comprises a servo gate that times a circumferential location of the servo sectors.

3. The disk drive as recited in claim 1, wherein the timing window comprises a sync window that times a circumferential location of a sync mark within the servo sectors.

4. The disk drive as recited in claim 1, wherein the control circuitry is further operable to:
clock a counter using the disk locked clock to generate the timing window; and
adjust the timing window by adding an offset to the counter.

5. The disk drive as recited in claim 1, wherein the control circuitry is further operable to adjust the disk locked clock by adjusting a center frequency for a timing control loop that synchronizes the disk locked clock.

6. The disk drive as recited in claim 5, wherein the control circuitry is further operable to adjust the center frequency by generating a transient in the center frequency that compensates for a transient in the disk locked clock.

7. The disk drive as recited in claim 1, wherein the control circuitry is further operable to calibrate the adjustment during a calibration mode by:
performing multiple seeks to seek the head between the first servo zone and the second servo zone;
adjusting the at least one of the disk locked clock and the timing window during each seek; and
selecting an operating adjustment that optimizes a metric.

8. The disk drive as recited in claim 7, wherein the metric comprises an accumulated timing error generated while reading a servo preamble in the servo sectors of the second zone.

9. The disk drive as recited in claim 7, wherein the metric comprises a detection error when detecting a sync mark in the servo sectors of the second zone.

10. The disk drive as recited in claim 1, wherein the control circuitry is further operable to:
measure an ambient temperature; and
when the head crosses from the first servo zone to the second servo zone, adjust at least one of the disk locked clock and the timing window in response to the ambient temperature to compensate for the timing transient.

11. The disk drive as recited in claim 1, wherein when the head crosses from the first servo zone to the second servo zone, the control circuitry is further operable to open the timing window early to compensate for the timing transient.

12. A method of operating a disk drive, the disk drive comprising a head actuated radially over a disk comprising a plurality of servo sectors defining a plurality of servo tracks, wherein the servo tracks form a plurality of servo zones, and a servo data rate of servo sectors in a first servo zone is different than a servo data rate of servo sectors in a second servo zone, the method comprising:
synchronizing a disk locked clock to the data rate of the servo sectors in the first servo zone, wherein the disk locked clock for generating a timing window relative to the servo sectors; and
when the head crosses from the first servo zone to the second servo zone, adjusting at least one of the disk locked clock and the timing window to compensate for a timing transient.

13. The method as recited in claim 12, wherein the timing window comprises a servo gate that times a circumferential location of the servo sectors.

14. The method as recited in claim 12, wherein the timing window comprises a sync window that times a circumferential location of a sync mark within the servo sectors.

15. The method as recited in claim 12, further comprising:
clocking a counter using the disk locked clock to generate the timing window; and
adjusting the timing window by adding an offset to the counter.

16. The method as recited in claim 12, further comprising adjusting the disk locked clock by adjusting a center frequency for a timing control loop that synchronizes the disk locked clock.

17. The method as recited in claim 16, further comprising adjusting the center frequency by generating a transient in the center frequency that compensates for a transient in the disk locked clock.

18. The method as recited in claim 12, further comprising calibrating the adjustment by:
performing multiple seeks to seek the head between the first servo zone and the second servo zone;
adjusting the at least one of the disk locked clock and the timing window during each seek; and
selecting an operating adjustment that optimizes a metric.

19. The method as recited in claim 18, wherein the metric comprises an accumulated timing error generated while reading a servo preamble in the servo sectors of the second zone.

20. The method as recited in claim 18, wherein the metric comprises a detection error when detecting a sync mark in the servo sectors of the second zone.

21. The method as recited in claim 12, further comprising:
measuring an ambient temperature; and
when the head crosses from the first servo zone to the second servo zone, adjusting at least one of the disk locked clock and the timing window in response to the ambient temperature to compensate for the timing transient.

22. The method as recited in claim 12, wherein when the head crosses from the first servo zone to the second servo zone, further comprising opening the timing window early to compensate for the timing transient.

* * * * *